US011993339B2

(12) United States Patent
Raffaelli (10) Patent No.: US 11,993,339 B2
(45) Date of Patent: May 28, 2024

(54) MOTOR VEHICLE WITH TWO FRONT STEERED WHEELS AND A FOUR-BAR LINKAGE CONTAINING TWO SUSPENSIONS

(71) Applicant: PIAGGIO & C. S.P.A., Pontedera (IT)

(72) Inventor: Andrea Raffaelli, Pontedera (IT)

(73) Assignee: PIAGGIO & CO. S.P.A., Pontedera (IT)

( * ) Notice: Subject to any disclaimer, the term of this patent is extended or adjusted under 35 U.S.C. 154(b) by 617 days.

(21) Appl. No.: 17/287,282

(22) PCT Filed: Oct. 16, 2019

(86) PCT No.: PCT/IB2019/058822
§ 371 (c)(1),
(2) Date: Apr. 21, 2021

(87) PCT Pub. No.: WO2020/084402
PCT Pub. Date: Apr. 30, 2020

(65) Prior Publication Data
US 2021/0394857 A1 Dec. 23, 2021

(30) Foreign Application Priority Data
Oct. 23, 2018 (IT) .......................... 102018000009693

(51) Int. Cl.
*B62K 5/10* (2013.01)
*B62K 5/027* (2013.01)
(Continued)

(52) U.S. Cl.
CPC ............... *B62K 5/10* (2013.01); *B62K 5/027* (2013.01); *B62K 5/05* (2013.01); *B62K 5/08* (2013.01)

(58) Field of Classification Search
CPC . B62K 5/027; B62K 5/05; B62K 5/08; B62K 5/10; B62K 2005/001; B62D 9/04; B60G 17/0162
(Continued)

(56) References Cited

U.S. PATENT DOCUMENTS

2018/0257729 A1* 9/2018 Mitsuoka ............... B62K 25/08

FOREIGN PATENT DOCUMENTS

EP 1180476 A1 2/2002
EP 3372480 A1 9/2018
(Continued)

*Primary Examiner* — Minnah L Seoh
*Assistant Examiner* — Christopher B Wehrly
(74) *Attorney, Agent, or Firm* — McGlew and Tuttle, P.C.

(57) ABSTRACT

The motor vehicle (1) comprises a forecarriage frame (11) to which a steering tube (13) is constrained, inside which a steering column (15) is rotatingly housed. The motor vehicle also comprises a four-bar linkage (23) connected to the forecarriage frame (11) and that supports a first front wheel (5') by means of a first supporting member (35) and a second front wheel (5") by means of a second supporting member (35"). The four-bar linkage comprises two crossbars (25, 27). A steering linkage (19) transmits the steering movement, controlled by means of the steering column, to the first front wheel (5) and to the second front wheel (5"). The motor vehicle also comprises suspensions (71') for the first front wheel (5') and for the second front wheel (5"). The two suspensions are at least partially housed in cavities (41) of the respective uprights (29', 29") of the four-bar link-age (23).

14 Claims, 8 Drawing Sheets

(51) Int. Cl.
*B62K 5/05* (2013.01)
*B62K 5/08* (2006.01)

(58) Field of Classification Search
USPC ........................................................ 280/283
See application file for complete search history.

(56) References Cited

FOREIGN PATENT DOCUMENTS

| | | | |
|---|---|---|---|
| KR | 20110115284 | A | 10/2011 |
| WO | 2012007819 | A1 | 1/2012 |
| WO | 2017017636 | A1 | 2/2017 |
| WO | 2017017639 | A1 | 2/2017 |
| WO | 2017115293 | A1 | 7/2017 |

\* cited by examiner

MOTOR VEHICLE WITH TWO FRONT STEERED WHEELS AND A FOUR-BAR LINKAGE CONTAINING TWO SUSPENSIONS

TECHNICAL FIELD

The present invention relates to the sector of tilting motor vehicles, i.e., vehicles provided with a tilting movement around a median plane which extends longitudinally along the vehicle. Tilting motor vehicles are typically three-wheeled motorcycles, with two front steered wheels and one rear driving wheel. The tilting movement allows the motor vehicle to tilt during driving, for example when traveling a curve.

BACKGROUND ART

In the field of motor vehicles there is an increasing offer of vehicles that combine the peculiarities of motorcycles, in terms of maneuverability, with the stability of four-wheeled vehicles. These models are represented, for example, by three-wheeled motor vehicles provided with two front steered wheels and with one rear driving wheel, and by four-wheeled motor vehicles, typically called quad-bikes.

More in detail, the three-wheeled motor vehicles mentioned above are provided with two front steered wheels, i.e., adapted to steer the vehicle controlled by the driver by means of the handlebar, and tilting, i.e., laterally tiltable with a leaning movement, in other terms a pivoting movement around an axis substantially oriented in the direction of travel. Three-wheeled vehicles also comprise a fixed axle rear driving wheel, mechanically connected to the engine and having the purpose of providing the torque and hence of allowing drive, while the coupled front wheels have the purpose of providing the directionality of the vehicle.

The coupled front wheels can tilt as well as steer. Due to this solution, with respect to a motor vehicle with only two wheels, motor vehicles with two wheels coupled to the forecarriage have greater stability guaranteed by the two front wheels that rest on the ground, similarly to the stability provided by an automobile.

The front wheels are kinematically connected to one another through kinematic mechanisms that ensure that these wheels tilt and steer substantially synchronously, for example through the interposition of four-bar linkages which connect the front wheels to a forecarriage frame. Moreover, these motor vehicles are provided with two independent suspensions, one for each front driving wheel. Each suspension is provided with an elastic element (spring) and a viscous element (damper).

Three-wheeled tilting motor vehicles therefore aim to guarantee the user the easy maneuverability of a two-wheeled motorcycle and, at the same time, the stability and safety of a four-wheeled motor vehicle.

WO-A-2012007819 discloses a tilting motor vehicle with two front steered wheels, comprising a four-bar linkage system that connects the two front wheels to one another, allowing them to perform steering movements and tilting movements.

The four-bar linkage comprises two crossbars hinged to the forecarriage frame and laterally connected to one another by two uprights. The four-bar linkage is positioned at a greater height with respect to the front steered wheels. Each front steered wheel is connected to a respective upright of the four-bar linkage by means of a connecting member. The structure of the four-bar linkage and of the suspensions is somewhat cumbersome and can be improved.

SUMMARY OF THE INVENTION

According to one aspect, a motor vehicle with two front steered wheels is provided, comprising a forecarriage frame and a steering tube constrained to the forecarriage frame. A four-bar linkage that supports a first front wheel and a second front wheel is connected to the forecarriage frame. The four-bar linkage, in practice consisting of an articulated parallelogram, in turn comprises a first crossbar and a second crossbar. The crossbars are parallel to one another and extend in transverse direction, i.e. from right to left with respect to the frame of the motor vehicle. Each crossbar is hinged in a respective center point to the forecarriage frame. The four-bar linkage further comprises a first upright and a second upright, which connect the first crossbar and the second crossbar to one another. The two uprights are located on opposite sides (right and left) of the median plane of the motor vehicle. The motor vehicle further comprises a steering column rotatingly housed in the steering tube and connected to a steering linkage to transmit a steering movement to the first front wheel and to the second front wheel. Respective suspension assemblies are associated with the two wheels and with the two uprights. A first suspension assembly for a first front wheel is associated with the first upright and a second suspension assembly for the second front wheel is associated with the second upright. According to embodiments disclosed herein, the first upright comprises a first cavity extending according to a longitudinal axis of the first upright and inside which the first suspension assembly is at least partially housed. Likewise, the second upright comprises a second cavity extending according to a longitudinal axis of the second upright and inside which the second suspension assembly is at least partially housed. The four-bar linkage is arranged above the first front wheel and the second front wheel. The first supporting member and the second supporting member extend under the four-bar linkage and under the respective first and second suspension assembly downward and toward the rotation axes of the first front wheel and of the second front wheel, respectively.

The terms "above", "below", "upper", "lower", "top", "bottom" "downward", "upward" and the like, defining the position of a part, element or component of the vehicle are referred to the vehicle when it is in its operating position.

In this way, a compact structure of the whole suspension and steering system of the front wheels is obtained, due to the fact that the suspensions are at least partially housed in the uprights.

Advantageously, each suspension assembly comprises an elastic member, for example a compression coil spring, and a shock absorber. Advantageously, each elastic member can be substantially coaxial to the shock absorber and arranged partially around it. Each shock absorber can comprise a cylinder and a piston moving therein, with a rod projecting from the cylinder. The cylinder of each shock absorber can be fully housed in the respective cavity or seat produced in the corresponding upright. A telescopically extensible enclosure, inside which the elastic member is inserted, can project from the bottom of the cavity in which the cylinder of the shock absorber is housed and can be connected to the supporting member, or half fork, of the respective front wheel.

In embodiments disclosed herein, the four-bar linkage is located above the first front wheel and the second front wheel, and the first supporting member and the second supporting member extend under the four-bar linkage and under the respective first and second suspension assembly downward and toward the axes of rotation of the first front wheel and of the second front wheel, respectively.

Each suspension assembly can comprise, in addition to a respective elastic member (spring) and shock absorber, a sleeve rotatingly housed in the cavity of the corresponding upright of the four-bar linkage that houses the suspension assembly. Each sleeve, or hollow shaft, is rotatable around a respective steering axis that can advantageously coincide with the longitudinal axis of the upright of the four-bar linkage, in which the sleeve is housed. The sleeve is suitably coaxial to the actual suspension, i.e., to the shock absorber and to the elastic member, which can be at least partially housed in the sleeve.

The two sleeves can be interconnected to the steering linkage so that a rotation of the steering column controls a simultaneous rotation of the two sleeves around the respective steering axes.

The sleeves are connected to the supporting members of the two front wheels, with a mechanical connection adapted to transmit to said supporting members (and hence to the respective wheels) the rotation movement of the sleeves around their longitudinal axes. For example, for this purpose a respective toggle link can be provided for each sleeve. The toggle link can comprise two connecting rods hinged to one another, one of which is in turn hinged to a point rigidly connected to the respective sleeve while the other connecting rod is hinged to a point rigidly connected to the respective wheel supporting member. The axes of the hinges to which the two connecting rods of each suspension are hinged are parallel to one another and parallel to the axes of rotation of the respective front wheels, when the vehicle is in neutral, i.e., not steered, position.

In other embodiments, the connection between each sleeve and the respective supporting member of the corresponding wheel can be obtained by means of a single connecting rod, hinged to a point rigidly integral with the sleeve and to a point rigidly integral with the supporting member. Also in this case the hinge axes of each connecting rod are parallel to one another and parallel to the rotation axis of the respective wheel. In this case the actual suspension, which is coaxial to the sleeve, can be provided with the capacity to pivot with respect to the sleeve and the inside thereof, for example it can be connected to the respective upright by means of a joint that allows small pivoting movements of the axis of the suspension with respect to the steering axis and hence with respect to the axis of the respective upright and of the respective sleeve.

This configuration has considerable advantages that will be described in detail hereunder with reference to an example of embodiment.

Further features and embodiments of the motor vehicle are described hereunder and defined in the appended claims, which form an integral part of the present description.

BRIEF DESCRIPTION OF THE DRAWINGS

The invention will be better understood by following the description and the accompanying drawings, which illustrate an exemplifying and non-limiting embodiment of the invention. More particularly, in the drawings.

DETAILED DESCRIPTION OF EMBODIMENTS

FIGS. 1 to 4 show overall views of a motor vehicle according to the invention, in a possible embodiment. Some parts of the motor vehicle, and in particular the rear parts, are omitted for simplicity of representation, as they are not relevant for the purposes of the present description.

The motor vehicle 1 is configured as a three-wheeled motorcycle, and more in particular having a rear driving wheel 3, connected to an engine, not shown, and two front steered wheels. The front steered wheels are indicated with 5' (left wheel) and 5" (right wheel).

Hereunder, components, assemblies or elements symmetrical with respect to a center-line plane M of symmetry of the motor vehicle 1 are indicated with the same reference number followed by one apostrophe ' for elements on one side of the center-line plane M, for example the left side, and with two apostrophes " for elements on the other side of the center-line plane M, for example the right side.

The motor vehicle 1, hereinafter for brevity also referred to simply as "vehicle", comprises a frame 7, including a rear frame 9 and a forecarriage frame 11. A steering tube 13, in which a steering column 15 is rotatingly housed, is fixed to the forecarriage frame 11. The upper end of the steering column 15 is rigidly constrained to a handlebar 17, while the lower end of the steering column 15, indicated with 15A, is coupled to a steering linkage 19, described in greater detail hereunder, by means of which the movement of the handlebar 17 is transferred to the front wheels 5', 5".

Figure 3:
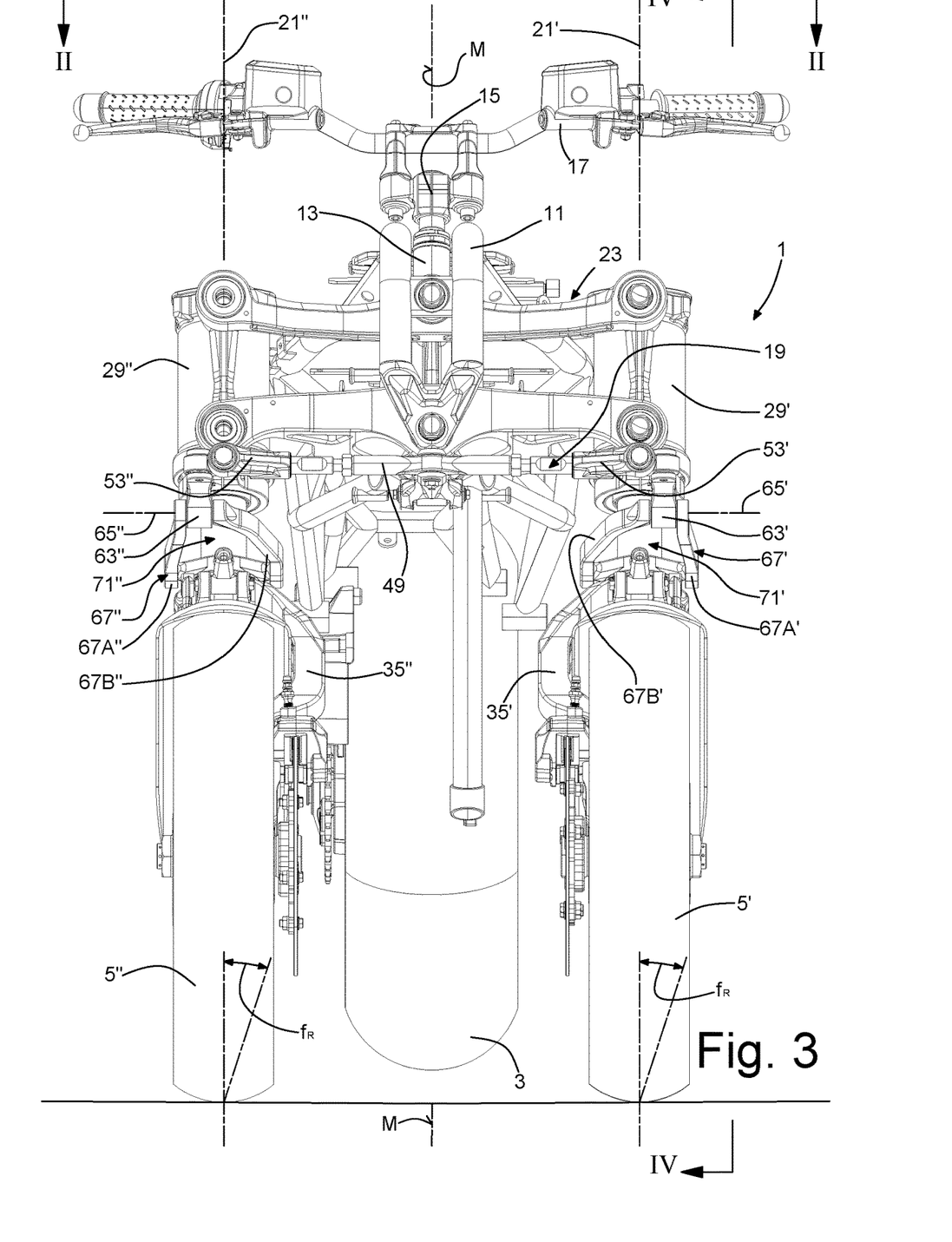
FIG. 3 shows a front view according to the line III-III of FIGS. 2 and 4.
Figure 4:
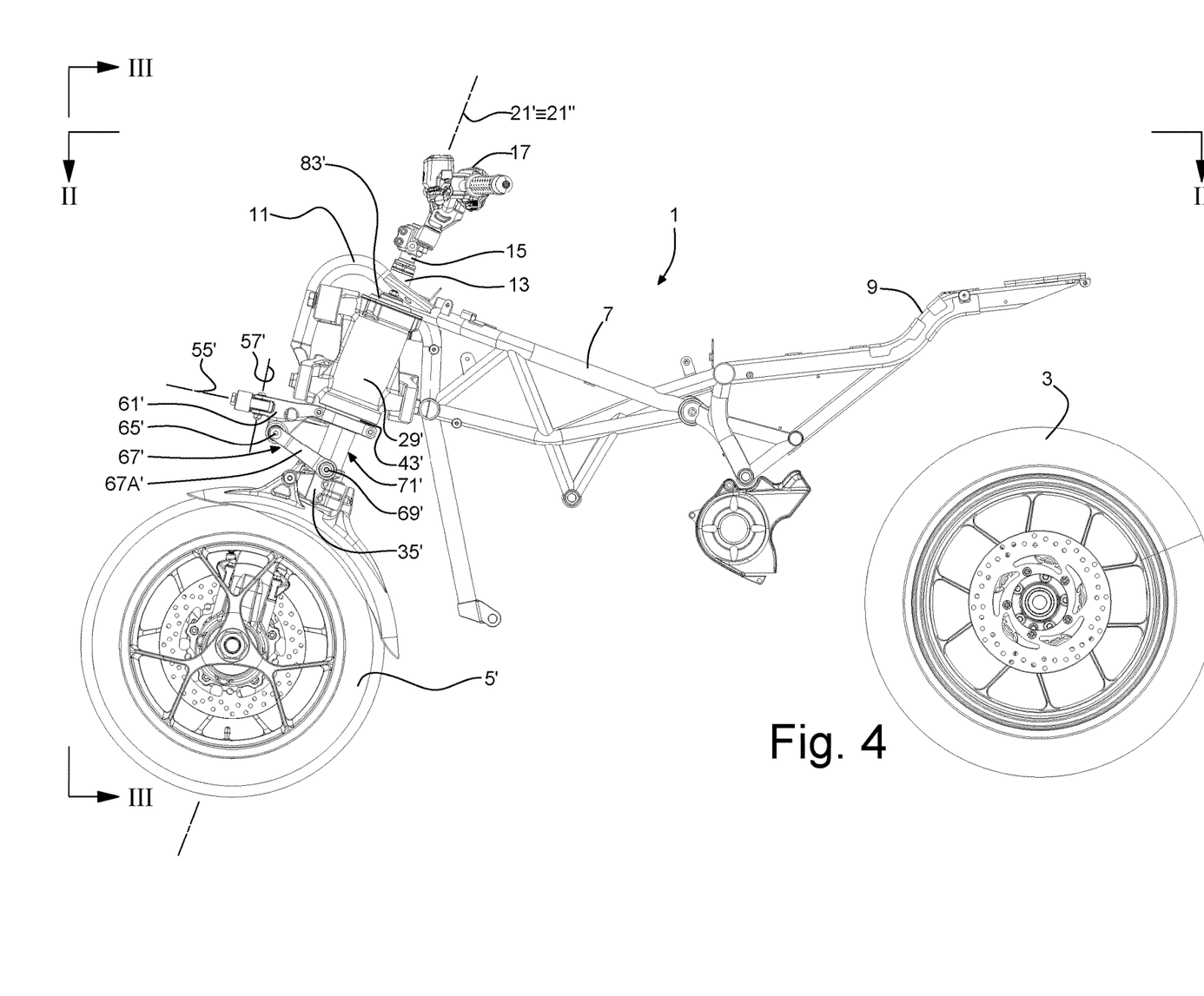
FIG. 4 shows a side view according to the line IV-IV of FIGS. 2 and 3.

The first front wheel 5' and the second front wheel 5" are connected to the forecarriage frame 11 so as to be able to rotate around respective steering axes and to be able to tilt or lean, i.e., move outside a plane orthogonal to the road surface, for example when the vehicle travels a curve at high speed. In FIG. 3 the tilt movement is indicated with fR. FIGS. 3 and 4 show projections in the plane of the figures of the steering axes indicated with 21' for the wheel 5' and with 21" for the wheel 5".

To allow the steering and tilting movement, the two wheels 5' and 5" are connected to the forecarriage frame 11 by means of a four-bar linkage mechanism, indicated as a whole with 23. The four-bar linkage 23 comprises two crossbars hinged to the forecarriage frame 11 and two uprights. Crossbars and uprights are hinged to one another by means of four hinges with axes which are parallel to one another and parallel to the axes of articulation of the crossbars to the forecarriage frame 11. More in particular, the four-bar linkage 23 comprises a first crossbar, or upper crossbar, 25 hinged by means of a hinge 25A to the forecarriage frame 11, and a second crossbar, or lower crossbar, 27 hinged by means of a hinge 27A to the forecarriage frame 11.

The first and the second crossbars 25, 27 are joined to one another by means of a first upright 29' and a second upright 29" on the right and left sides, respectively, of the vehicle 1. The reference numbers 31', 33' and 31", 33" (see in particular FIG. 1) indicate hinges at which the uprights 29' and 29" are hinged to the crossbars 25, 27. The axis of each upright 29', 29" coincides with the steering axis 21' of the wheel 5' and with the steering axis 21" of the second wheel 5".

The first front wheel 5' is connected to the first upright 29' by means of a first supporting member 35', indicated hereinafter also as half fork 35', and a first suspension described in detail below, at least partially housed in the first upright 29'. Symmetrically, the second front wheel 5" is connected to the second upright 29" by means of a second supporting member 35", indicated hereinafter also as half fork 35", and a second suspension at least partially housed in the second upright 29". The suspensions allow a pitch movement of the vehicle and up-and-down movements of the wheels 5', 5".

Figure 5:
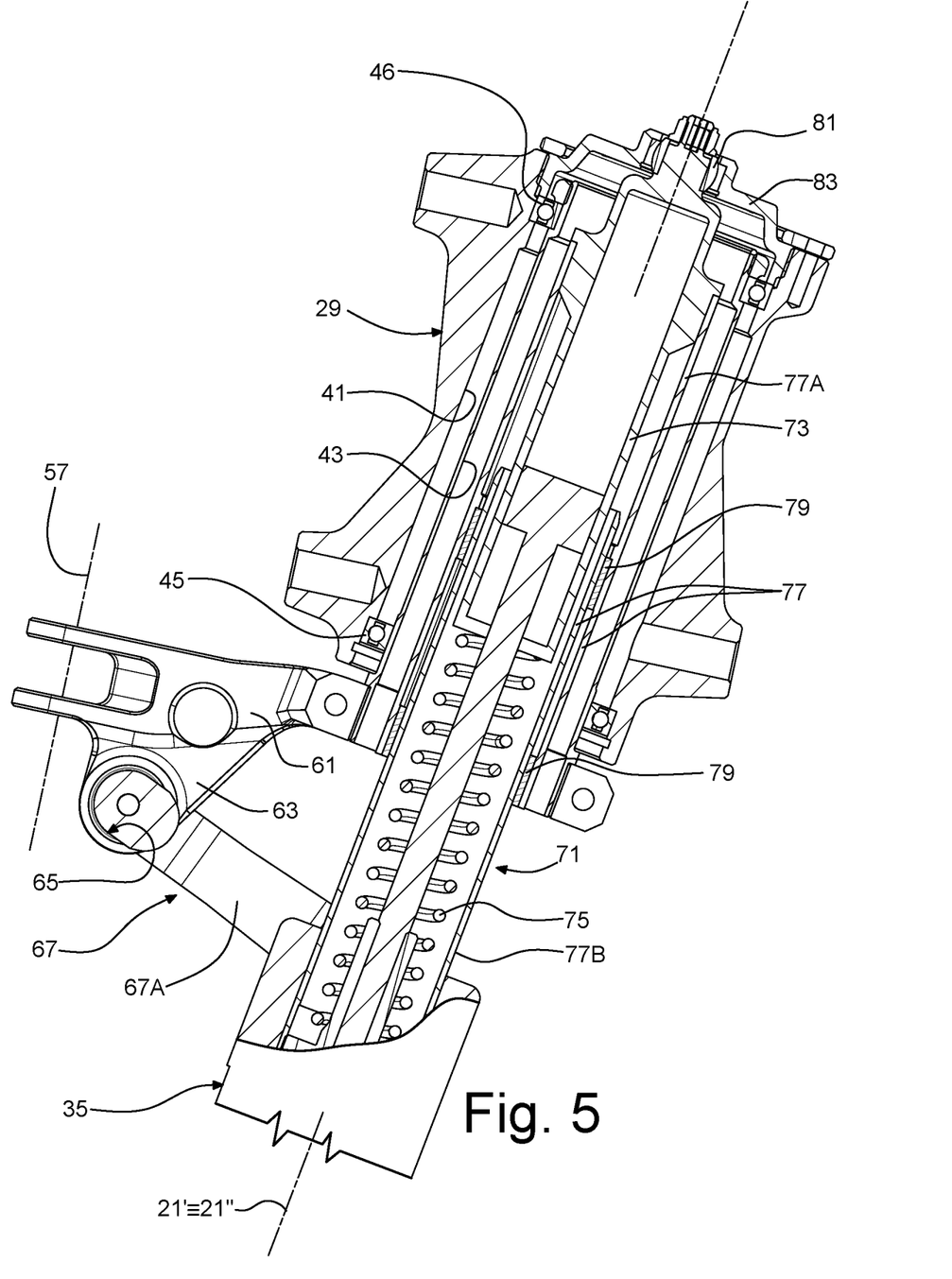
FIG. 5 shows a section of one of the front suspensions, according to a plane containing the axis of the suspension and the steering axis.

The structure of each suspension and of the related upright, in which it is at least partially housed, is illustrated in particular in the section of FIG. 5. As the section of the two uprights 29', 29" and of the respective suspensions is the same for the two sides, right and left, of the vehicle 1, in FIG. 5 the various components are marked with reference numbers without apostrophes. The description below therefore applies both to the first upright and to the second upright, each of which contains the same components described below for a generic of said first and second upright and related suspension.

Each upright 29 comprises an inner cavity 41, preferably substantially cylindrical in shape, with an axis coincident with the steering axis 21. A sleeve or hollow shaft 43, preferably cylindrical and coaxial to the cavity 41, is rotatingly housed in each cavity 41. The sleeve or hollow shaft 43 can be supported in the cavity 41 by means of bearings, for example rolling-element bearings. For the reasons set forth below, the bearings 43 can have a mainly radial load capacity and do not require axial load capacity, which is particularly advantageous from the point of view of the cost of these components. In the embodiment illustrated the sleeve 43 is supported by means of two radial bearings 45 and 46, for example two ball bearings. The sleeve 43 can thus rotate around the axis 21.

The rotation of each sleeve 43 around the respective steering axis 21', 21" is imparted by means of the handlebar 17, the steering column 15 and the steering linkage 19. In the exemplary embodiment illustrated, the steering linkage 19 comprises a connecting rod 47 hinged around an axis 47A (FIG. 1) to the lower end 15A of the steering column. The connecting rod 47 is centrally hinged to a steering bar 49 that extends in transverse direction with respect to the frame of the motor vehicle, i.e. from right to left. The steering bar 49 can consist of one body, or can be divided into two portions, or half-bars, each extending from the median plane of the motor vehicle 1 to the right and to the left, respectively. The two half-bars can be articulated to one another around a longitudinal axis of the steering bar 49, i.e., an axis extending in the same direction as the steering bar, in a transverse direction with respect to the median plane of the motor vehicle 1.

Figure 1:
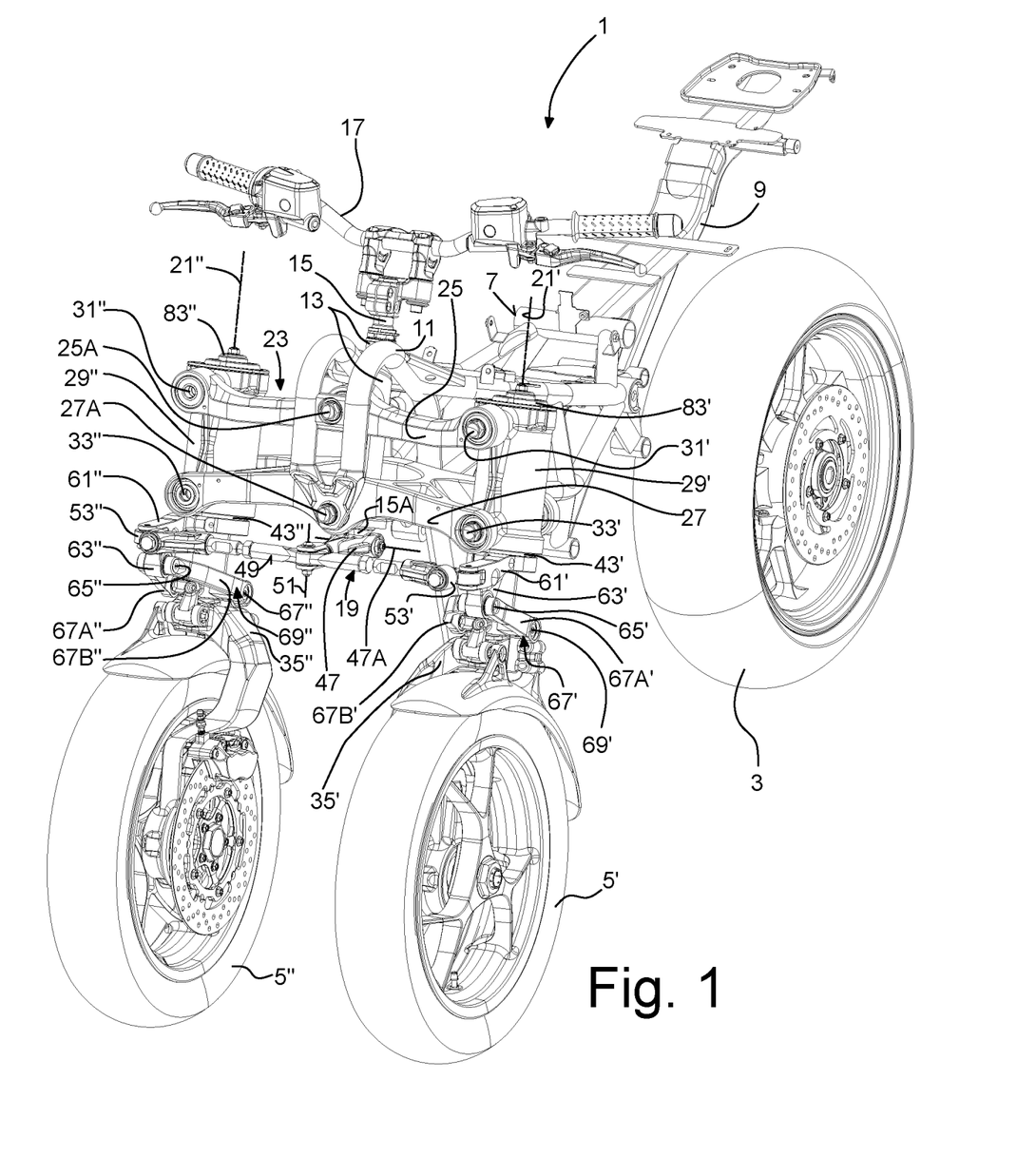
FIG. 1 shows a front isometric view of a motor vehicle according to a first embodiment.
Figure 2:
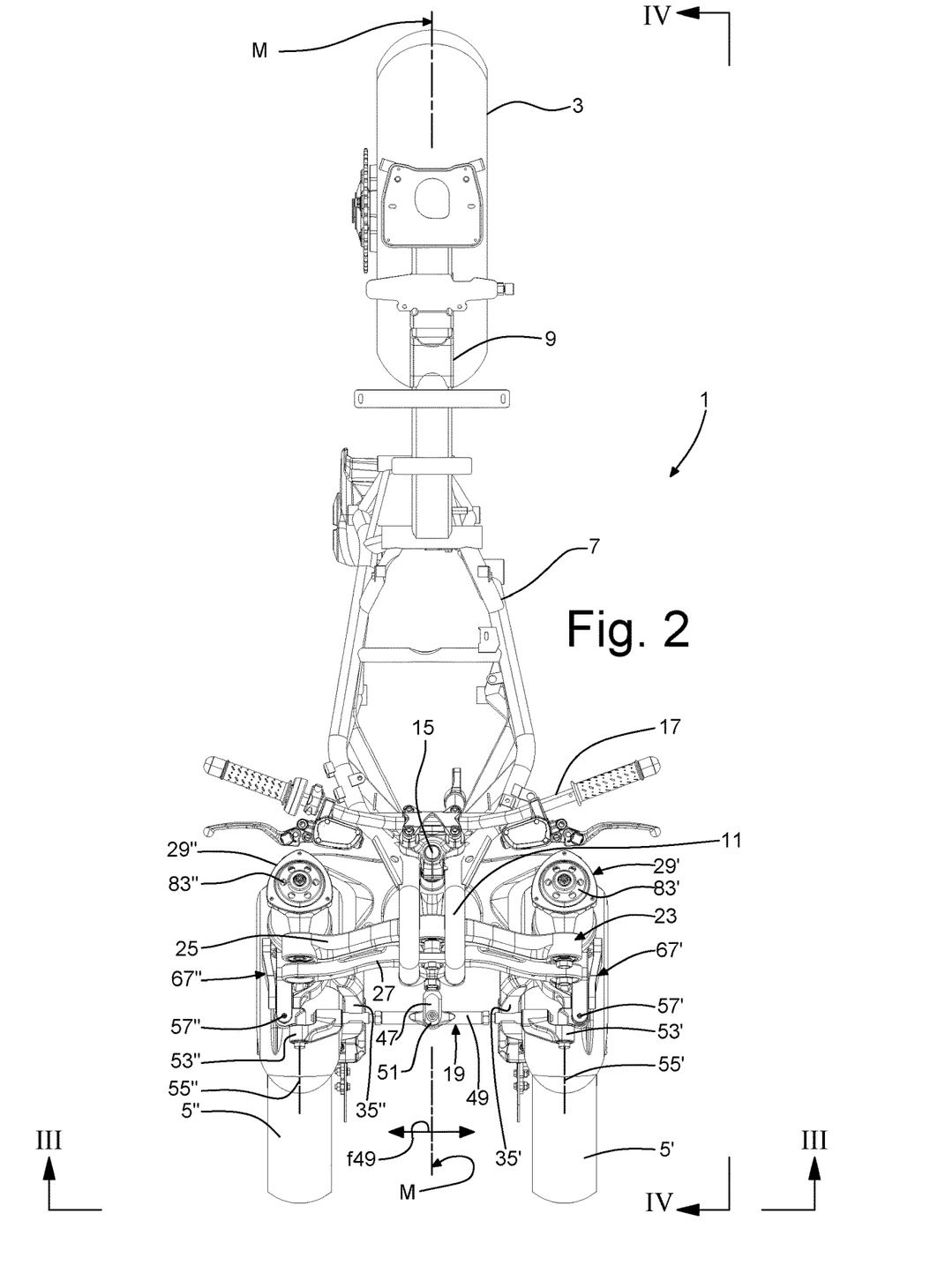
FIG. 2 shows a plan view of the motor vehicle according to the line II-II of FIGS. 3 and 4.

The axis of the hinge that joins the steering bar 49 to the connecting rod 47 is indicated with 51 (see in particular FIG. 1). The rotation of the handlebar 17 around the axis of the steering column thus causes a translation according to the double arrow f49 of the steering bar (FIG. 2). The connecting rod 47 is in actual fact divided into two parts, rotating around a longitudinal axis of the connecting rod itself, which allow a variation in the length of the connecting rod. The rotation around the longitudinal axis allows the tilting movements of the steering bar and of the four-bar linkage.

The steering bar 49 is joined at the ends thereof to the two sleeves 43 housed in the first upright 29' and in the second upright 29", respectively. The connection is obtained by means of a first joint 53' and a second joint 53". The two joints 53' and 53" allow rotation movements around two axes substantially orthogonal to each other, indicated with 55', 57' and 55", 57", see in particular FIG. 4. The axes 55', 57' and 55", 57" are approximately orthogonal to the longitudinal direction of the steering bar 49. In the embodiment illustrated, as can be seen for example in FIG. 2, axes 55', 57' and 55", 57" do not intersect, i.e., are not incident, but have an offset between them. The first joint 53' and the second joint 53" connect the two opposite ends of the steering bar 49 respectively to a first arm 61', rigidly connected to the first sleeve 43', and to a second arm 61" rigidly connected to the second sleeve 43". In this way, a rotation of the steering column 15 in the steering tube 13 imparts a simultaneous rotation to the two sleeves 43', 43" around the respective steering axes 21', 21". In a manner known per se, the rotation can be different for the two wheels, as the wheel that is on the inside of the curve traveled by the vehicle can steer to a greater extent than the wheel on the outside of the bend, so that the two wheels follow trajectories with slightly different radii of curvature.

Each arm 61', 61" has an appendage 63', 63" that forms a hinge 65', 65", to which a first end of a connecting rod 67', 67" is hinged. In the embodiment illustrated, each connecting rod 67', 67" is in actual fact double and is formed by two components of connecting rod 67A', 67B' and 67A", 67B". The second end of each connecting rod 67', 67" is hinged, at a hinge 69', 69", to the respective supporting member or half fork 35', 35" to which the wheel 5', 5" is connected. The hinge 65', 65" defines a pivot axis of the connecting rod 67', 67" with respect to the arm 61', 61" and to the respective appendage 63', 63", said axis being parallel to the rotation axis of the respective front wheel 5', 5" when the motor vehicle is in vertical neutral, i.e., not steered, position. Likewise, the hinge 69', 69" defines an axis parallel to the axis of the hinge 65', 65" and hence parallel to the rotation axis of the respective front wheel 5', 5" when the motor vehicle 1 is in vertical neutral position.

A suspension assembly comprising the sleeve 43', 43" and an actual suspension, indicated with 71' for the wheel 5' and with 71" for the wheel 5", is associated with each wheel 5', 5".

More in particular, each supporting member or half fork 35', 35" is rigidly constrained to a first part of the respective suspension 71', 71". The structure of each suspension assembly is shown in detail in FIG. 5, where the suspension is indicated with 71 and the sleeve is indicated with 43. The suspension assembly of FIG. 5 can represent the left suspension assembly 43', 71' or the right suspension assembly 43", 71", without distinction. The suspension 71 comprises a shock absorber 73 and an elastic member 75, enclosed in a telescopically extensible and retractable enclosure 77. The enclosure 77 can comprise an outer tubular component 77A and an inner tubular component 77B, coaxial and partially inserted inside one another to form the telescopically extensible enclosure. Bushings or bearings 79 are interposed between the outer tubular component 77A and the inner tubular component 77B to facilitate and guide mutual sliding.

The telescopically extensible enclosure 77 is constrained on one side to the respective upright 29' or 29" and on the other to the respective supporting member 35', 35" of the wheel 5', 5". In the embodiment illustrated, the inner tubular component 77B is rigidly connected to the supporting member, or half fork 35', 35", as visible in particular in FIG. 5, while the outer tubular component 77A is rigidly connected to a part of the shock absorber 73, which is in turn connected to the upright 29 in the manner described below.

In the embodiment illustrated the suspension 71', 71" is connected to the respective upright 29', 29" by means of a ball joint 81, shown in detail only in FIG. 5. More in general, the connection between suspension 71', 71" and upright 29', 29" can be formed by any mechanism that allows a double degree of freedom around two pivot axes incident with each other, for example orthogonal to each other, so that the suspension can pivot with small rotations around the two axes with respect to the four-bar linkage and in particular with respect to the upright in which it is at least partially housed, as visible in FIG. 5.

In the embodiment illustrated, the ball joint 81 is mounted in a closing element 83', 83" that closes the top of the inner cavity 41 of the respective upright 29', 29".

The outer diameter of the enclosure 77 that houses the elastic and damping components of the suspension 71 is smaller than the inner diameter of the sleeve 43, which allows small pivoting movements, for example of the order of 1-3°, of the suspension 71 with respect to the sleeve 43 and hence with respect to the related upright 29', 29". In substance, each suspension 71 is constrained to the upright 29', 29" by means of the ball joint 81 and by means of the connecting rod 67. When the suspension acts with a springing, or dive, movement that causes a compression of the suspension, this can carry out a pivoting movement around the joint 81 while the respective supporting member 35, i.e. the half fork that carries the respective front wheel 5', 5", moves toward the four-bar linkage 23.

Therefore, in substance, each suspension 71', 71" does not provide a telescoping guide provided only with a contraction and expansion movement, but is capable of performing pivoting movements with respect to the corresponding upright 29', 29", which are guided by the ball joint 81 and by the coupling provided by the connecting rod 67, which imparts to the lower part (inner tubular element 77B) of the suspension 71 and to the supporting member 35', 35" of the front wheel 5', 5" a pivoting movement around the joint 81 in the case of a dive (pitch) movement of the vehicle or of an up-and-down movement of the wheel. The steering is not influenced by the dive (contraction) of the suspension 71', 71", and the pivoting of the suspension obtained by means of the joint 81 ensures that there are no variations in the camber angle but only in the caster angle.

Various advantages are obtained with this arrangement. The axial loads applied to the suspension 71', 71" are transferred directly to the respective upright 29', 29" through the ball joint 81. Consequently, these loads do not weigh on the bearings 45, 46 between sleeve 43 and upright 29', 29", with the consequence that the bearings 45, 46 can substantially have no axial load capacity and hence a limited cost.

The load on the bushings or bearings 79 is reduced and this reduces the friction forces that oppose the dive movement of the suspension, with consequent benefit in terms of fluidity of the suspension.

The closing elements 83', 83" close the axial cavities 41 of the uprights 29'. 29" providing an improved appearance and preventing dirt from entering.

Figure 6:
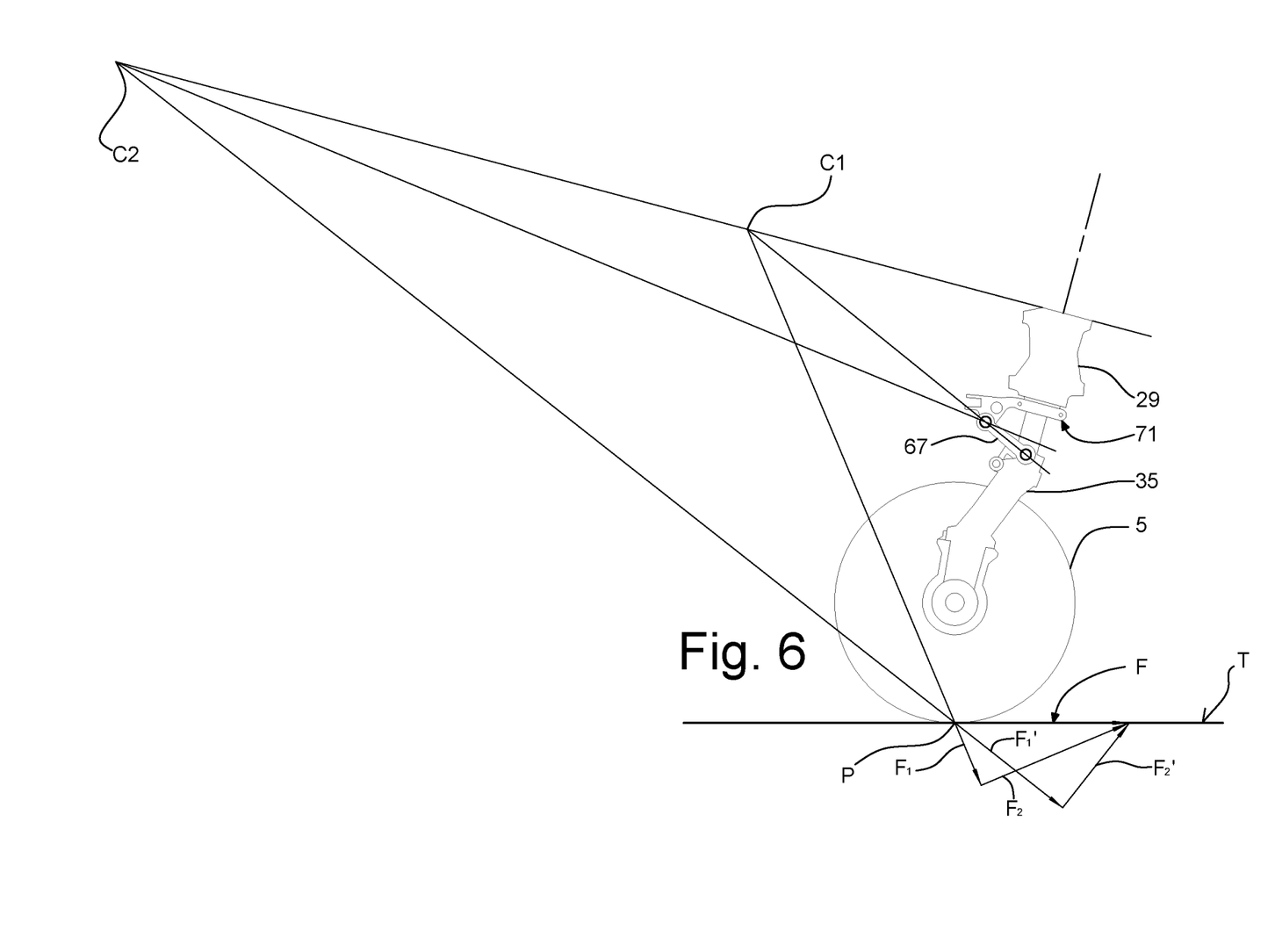
FIG. 6 shows a diagram illustrating the pro-dive effect obtained with a particular arrangement of the components of the suspension.

The configuration illustrated above also has advantages in terms of driving comfort, which are clear with reference to the diagram of FIG. 6 and which derive from the pro-dive behavior of the suspension thus configured. The diagram of FIG. 6 shows a simplified lateral view of one of the two front wheels, indicated with 5, with the respective supporting member 35 and the suspension 71, partially housed in the upright 29. During the dive movement, i.e. during a compression of the suspension 71, for example while braking, the suspension moves with a roto-translation movement. FIG. 6 indicates the two instant centers of rotation of the suspension in the conditions with the suspension completely extended (point C1) and with the suspension compressed (point C2). The two points C1 and C2 are obtained by applying Chasles' theorem, as shown by the construction lines in the diagram of FIG. 6. The position of the instant centers of rotation is a function of the position of the connecting rod 67 that connects the lower part of the suspension to the upright 29 of the four-bar linkage.

During braking, in the point P of contact between the wheel 5 and the ground T, a braking force F is applied to the wheel 5. This force can be broken down into two components, respectively parallel to the line joining the point P with the instant center of rotation and orthogonal to this joining line. The two components have different sizes as a function of the position of the instantaneous point of rotation, and hence of the orientation of the line joining this point with the point of contact between wheel 5 and ground T. In FIG. 6, the two components of the force F are indicated with F1 and F2 when the suspension 71 is extended and the same components are indicated with F1' and F2' when the suspension 71 is compressed. The component F2, F2' contributes to compression of the suspension (prodive effect), but this effect decreases as the suspension is compressed, due to a movement away from the instant center of rotation and consequent reduction of the intensity of the component F2, F2', which simulates a progressivity of the suspension.

Figure 7:
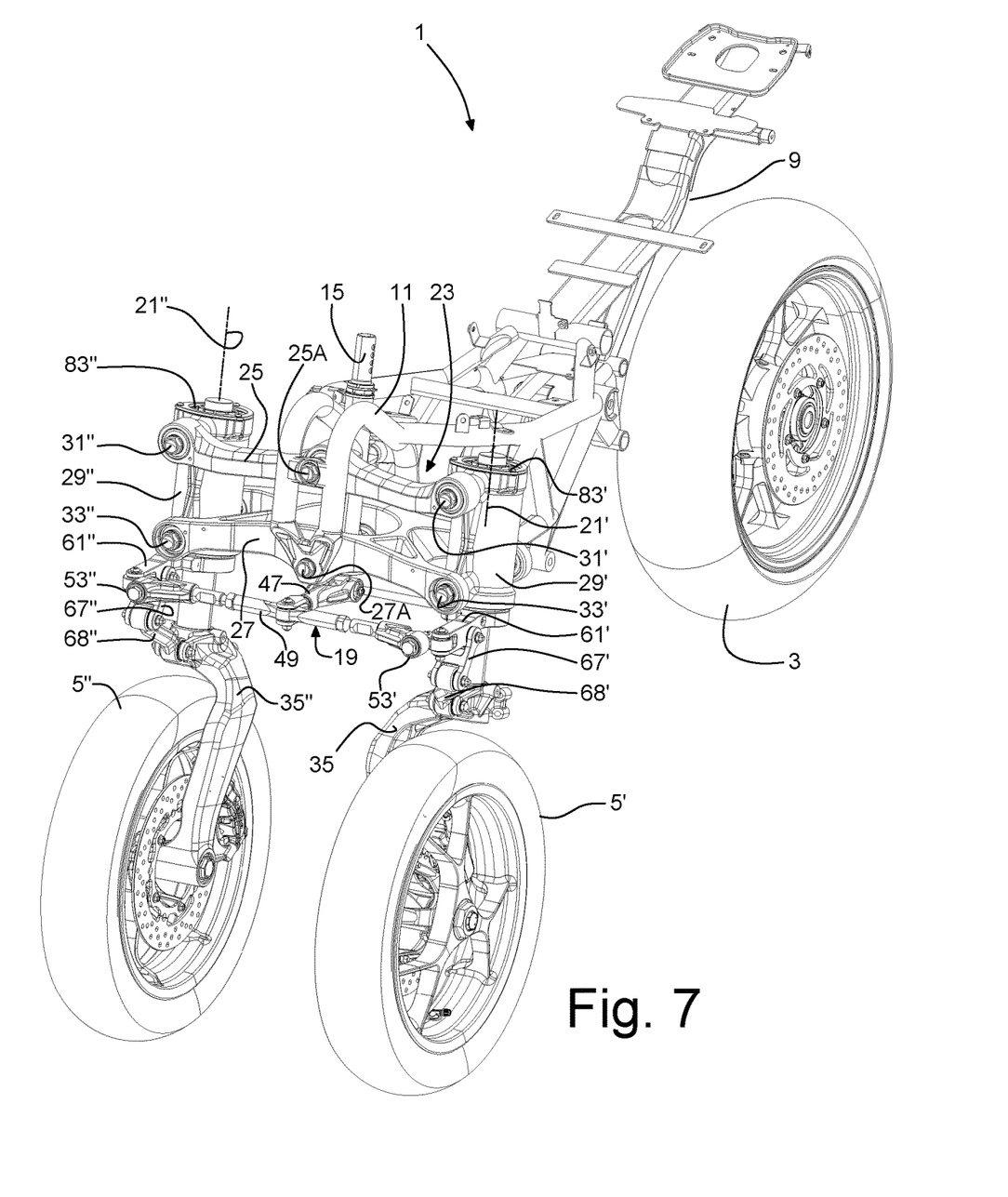
FIG. 7 shows an axonometric view of a motor vehicle in a second embodiment.
Figure 8:
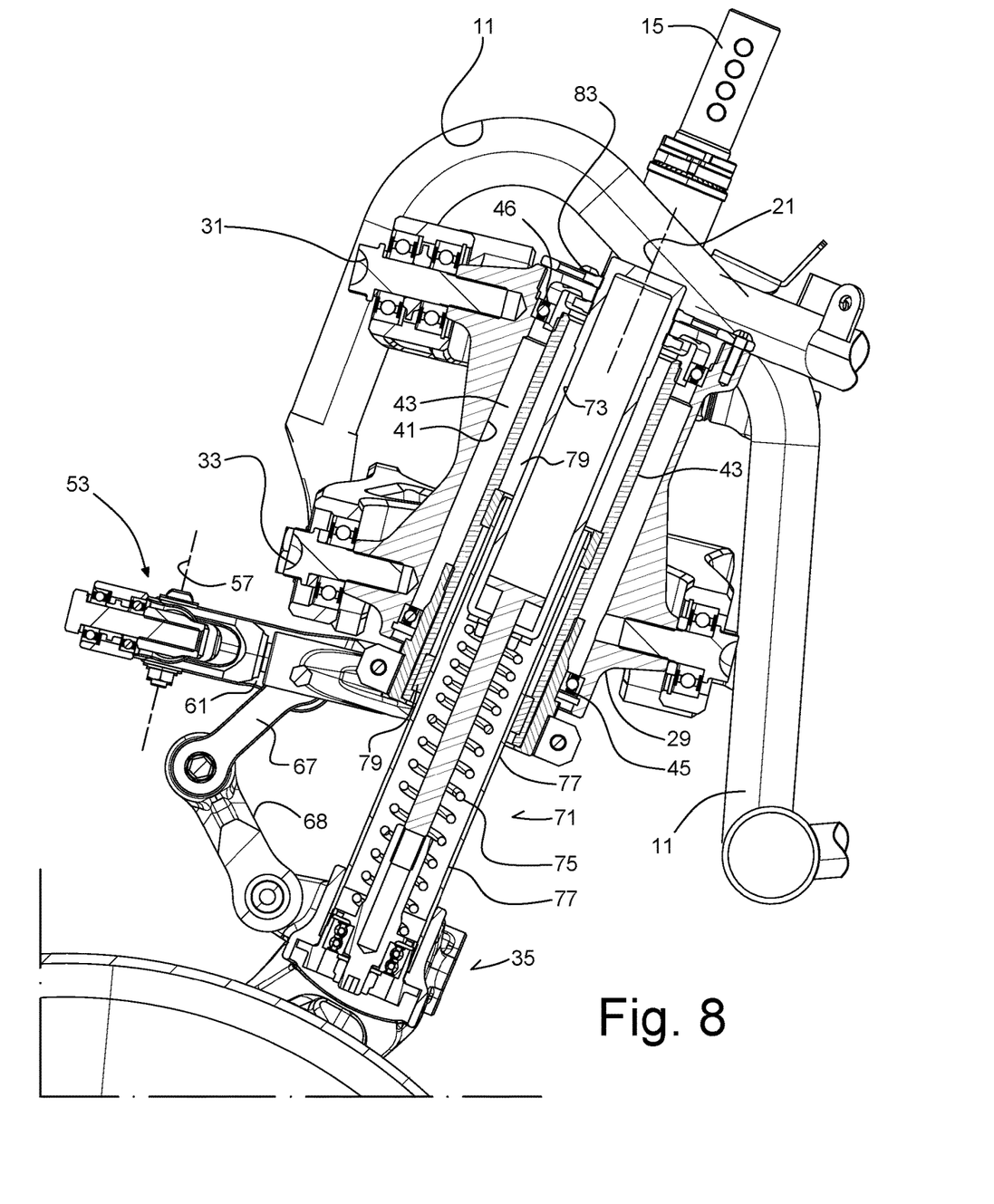
FIG. 8 shows a section of one of the uprights of the four-bar linkage with related suspension assembly inside it.

FIGS. 7 and 8 show a motor vehicle in a second embodiment. FIG. 7 shows the whole vehicle in an isometric view, while FIG. 8 is a section of one of the uprights of the four-bar linkage, according to a plane containing the longitudinal axis of the upright. As the two uprights are substantially identical, the section of FIG. 8 can refer to the right upright or to the left upright, without distinction. The reference numbers used in FIG. 8 therefore have no apostrophes distinguishing the right components from the left components.

In FIGS. 7 and 8 the same numbers indicate the same or corresponding parts to those of FIGS. 1 and 6 and which shall not be described again. The main difference between the embodiment of FIGS. 7 and 8 and the embodiment of FIGS. 1 to 6 substantially consists in the fact that the suspension 73', 73" of each suspension assembly 43', 71' and 73", 73" is not provided with the pivoting movement with respect to the related sleeve 43', 43". The structure of the suspension assemblies is shown in detail in the section of FIG. 8. Here it can be seen that the suspension 71, and more precisely its shock absorber 73, is rigidly fixed to the closing element of the upright 29 and cannot pivot with respect thereto.

The suspension 71 is housed coaxially inside the sleeve 43 and can travel with respect thereto around bearings or bushings 79 interposed between the suspension 71 and the sleeve 43, accommodated rotatingly around the axis 21 in the axial cavity 41 of the upright 29. In the embodiment illustrated, the suspension 71 comprises a sleeve 77 sliding axially with respect to the sleeve 43 and forming an element telescopically extensible in combination with the cylinder of the shock absorber 73. The enclosure 77 is torsionally coupled to the supporting member 35 and hence rotates around the axis 21 integral therewith.

The steering bar 49 (FIG. 7) is constrained by means of joints 53', 53" to the arms 61', 61" integral with the sleeves 43', 43". Just as in the embodiment of FIGS. 1 to 6, the arms 61', 61" project in a cantilever fashion each from the respective sleeve 43', 43" transversely to the steering axis 21' 21".

Each arm 61', 61" is connected to the respective supporting member 35', 35" by means of a toggle link comprising a connecting rod 67', 67" hinged to the arm 61', 61" and to a further connecting rod 68', 68". This latter is in turn hinged to the respective supporting member 35', 35" of the front wheel 5', 5". When the motor vehicle is in vertical neutral, i.e., not steered, position, the axes of articulation of the toggle links 67', 68' and 67", 68" are in substantially horizontal position and are substantially parallel to the axes of rotation of the front wheels 5', 5".

The sleeve 43 is rotatingly housed in the axial cavity 41 of the respective upright 29 by means of bearings 45, 46. In this embodiment, the bearings 45, 46 are preferably angular contact bearings or in any case bearings having an axial load capacity. In some embodiments, the angular contact bearings can be replaced by combinations of radial and axial bearings.

The embodiment of FIGS. 7 and 8 has, similarly to the embodiment of FIGS. 1 to 6, the advantage of housing the suspensions at least partially in the axial cavities of the uprights.

While the invention has been described in terms of various specific embodiments, it will be apparent to those skilled in the art that various modifications, changes and omissions are possible without departing from the spirit and scope of the claims.

The invention claimed is:

1. A motor vehicle with two front steered wheels, the motor vehicle comprising:
    a forecarriage frame;
    a steering tube, constrained to the forecarriage frame;
    a four-bar linkage connected to the forecarriage frame that supports a first front wheel by means of a first supporting member and a second front wheel by means of a second supporting member; wherein the four-bar linkage comprises: a first crossbar and a second crossbar, parallel to each other and hinged in a respective center point to the forecarriage frame; a first upright and a second upright, which connect the first crossbar and the second crossbar to each other;
    a steering column rotatingly housed in the steering tube and connected to a steering linkage to transmit a steering movement to the first front wheel and to the second front wheel; and
    a first suspension assembly for the first front wheel, and a second suspension assembly for the second front wheel,
    wherein the first upright of the four-bar linkage comprises a first cavity extending according to a longitudinal axis of the first upright and inside which the first suspension assembly is at least partially housed; and the second upright of the four-bar linkage comprises a second cavity extending according to a longitudinal axis of the second upright and inside which the second suspension assembly is at least partially housed, and
    wherein the four-bar linkage is arranged above the first front wheel and the second front wheel; and wherein the first supporting member and the second supporting member extend under the four-bar linkage and under the respective first and second suspension assembly downward and toward the rotation axes of the first front wheel and of the second front wheel, respectively.

2. The motor vehicle of claim 1, wherein the first suspension assembly comprises a first sleeve rotatingly housed in the first cavity of the first upright and inside which a first suspension of the first suspension assembly is at least partially accommodated; wherein the second suspension assembly comprises a second sleeve rotatingly housed in the second cavity of the second upright and inside which a second suspension of the second suspension assembly is at least partially accommodated.

3. The motor vehicle of claim 2, wherein the first sleeve and the second sleeve are interconnected to the steering linkage so that a rotation of the steering column controls a simultaneous rotation of the first sleeve and of the second sleeve around respective steering axes parallel to the axes of the first upright and of the second upright.

4. The motor vehicle of claim 2, wherein the first suspension and the second suspension are connected to an end closure of the respective cavity.

5. The motor vehicle of claim 2, wherein each said first sleeve and second sleeve is supported in the respective first cavity and second cavity by means of radial bearings.

6. The motor vehicle of claim 2, wherein the first suspension and the second suspension are constrained to the first upright and to the second upright of the four-bar linkage by means of a first joint and a second joint, respectively; and wherein the first joint allows pivoting between the first suspension and the first upright and the second joint allows pivoting between the second suspension and the second upright.

7. The motor vehicle of claim 6, wherein the first joint and the second joint are ball joints.

8. The motor vehicle of claim 2, wherein: the first sleeve is rigidly connected to a first arm cantilever extending with respect to the longitudinal axis of the first upright; the second sleeve is rigidly connected to a second arm cantilever extending with respect to the longitudinal axis of the second upright; wherein a first end of at least one steering rod and a second end of said at least one steering rod are coupled respectively to said first arm and second arm; and wherein said at least one steering rod is connected to the steering column so as to perform steering movements under the control of the steering column.

9. The motor vehicle of claim 8, wherein: each said first sleeve and second sleeve is connected to the respective first supporting member and second supporting member by means of at least one respective first connecting rod and second connecting rod coupled respectively to the first arm and to the second arm of the first sleeve and of the second sleeve around an axis parallel to the rotation axis of the respective first front wheel and second front wheel when the vehicle is in a vertical neutral, i.e., not steered, position.

10. The motor vehicle of claim 9,
    wherein the first suspension and the second suspension are constrained to the first upright and to the second upright of the four-bar linkage by means of a first joint and a second joint, respectively; and wherein the first joint allows pivoting between the first suspension and the first upright and the second joint allows pivoting between the second suspension and the second upright, and
    wherein each of said first connecting rod and second connecting rod is also coupled to the respective first supporting member and second supporting member, so as to transmit rotation movements of the first sleeve and of the second sleeve to the first supporting member and to the second supporting member.

11. The motor vehicle of claim 9, wherein each said first connecting rod and second connecting rod is also coupled to a first further connecting rod and second further connecting rod; wherein each first further connecting rod and second further connecting rod is coupled to the respective first supporting member and second supporting member of the respective front wheel around a second axis, parallel to the first axis, so as to transmit rotation movements of the first sleeve and of the second sleeve to the first supporting member and to the second supporting member.

12. The motor vehicle of claim 8, wherein said at least one steering rod is connected to each said first arm and second arm by means of a respective joint that allows two degrees of freedom around two rotation axes substantially orthogonal to each other and orthogonal to the longitudinal axis of said at least one steering rod.

13. The motor vehicle of claim 1, wherein each said first suspension assembly and second suspension assembly comprises an enclosure coaxial to the cavity of the respective upright and defining a housing of the suspension; said enclosure being rigidly constrained to the respective supporting member of the corresponding front wheel and being at least partially housed in the cavity of the respective upright.

14. The motor vehicle of claim 1, wherein each said first suspension assembly and second suspension assembly comprises an enclosure comprising an inner tubular component and an outer tubular component, telescopically coupled to each other and defining a housing in which a shock absorber and an elastic member of the suspension are contained; wherein one of said outer tubular component and inner tubular component is constrained to the respective upright; and wherein the other of said outer tubular component and inner tubular component is rigidly constrained to the respective supporting member of the corresponding front wheel; each enclosure being at least partially housed in the respective cavity of the respective upright.

\* \* \* \* \*